US009356925B2

(12) United States Patent
Alrabady et al.

(10) Patent No.: US 9,356,925 B2
(45) Date of Patent: May 31, 2016

(54) APPARATUS AND METHOD FOR PROVIDING LOCATION BASED SECURITY FOR COMMUNICATION WITH A REMOTE DEVICE

(75) Inventors: Ansaf I. Alrabady, Livonia, MI (US); Fred W. Huntzicker, Ann Arbor, MI (US); David Racklyeft, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 886 days.

(21) Appl. No.: 12/263,029

(22) Filed: Oct. 31, 2008

(65) Prior Publication Data

US 2010/0109835 A1 May 6, 2010

(51) Int. Cl.
*H04B 13/02* (2006.01)
*H04L 29/06* (2006.01)

(52) U.S. Cl.
CPC .......... *H04L 63/0823* (2013.01); *H04L 63/107* (2013.01)

(58) Field of Classification Search
USPC ............. 340/5.2, 5.21, 5.86, 539.13, 539.11, 340/539.14; 342/357.25, 357.33, 357.34
See application file for complete search history.

(56) References Cited

U.S. PATENT DOCUMENTS

| 6,138,026 | A * | 10/2000 | Irvin .......................... 455/456.3 |
| 6,622,090 | B2 * | 9/2003 | Lin ............................... 701/213 |
| 7,133,775 | B2 * | 11/2006 | Adamski et al. .............. 701/211 |
| 7,327,250 | B2 * | 2/2008 | Harvey .................... 340/539.13 |
| 7,333,820 | B2 * | 2/2008 | Sheha et al. .................. 455/457 |
| 7,612,668 | B2 * | 11/2009 | Harvey ......................... 340/550 |
| 7,737,841 | B2 * | 6/2010 | Derrick et al. ........... 340/539.13 |
| 7,936,262 | B2 * | 5/2011 | Derrick et al. ........... 340/539.13 |
| 2002/0062193 | A1 * | 5/2002 | Lin ............................... 701/208 |
| 2003/0014372 | A1 * | 1/2003 | Wheeler et al. ................. 705/71 |
| 2003/0083819 | A1 * | 5/2003 | Rooney et al. .................... 702/5 |
| 2003/0144795 | A1 * | 7/2003 | Lin ............................... 701/213 |
| 2004/0064334 | A1 * | 4/2004 | Nye ................................ 705/1 |
| 2004/0125798 | A1 * | 7/2004 | Hondo et al. ................. 370/389 |
| 2004/0143515 | A1 | 7/2004 | Kawasaki |
| 2005/0017855 | A1 * | 1/2005 | Harvey ...................... 340/426.1 |
| 2006/0127848 | A1 | 6/2006 | Sogo et al. |
| 2006/0129309 | A1 | 6/2006 | Alewine et al. |
| 2006/0238340 | A1 * | 10/2006 | Harvey ......................... 340/550 |

(Continued)

FOREIGN PATENT DOCUMENTS

DE 602005001316 T2 1/2008
WO 02025307 A2 3/2002

OTHER PUBLICATIONS

German Patent & Trademark Office, German Office Action dated Jul. 29, 2015 for Application No. 10 2009 050 936.4.

(Continued)

*Primary Examiner* — Travis Hunnings
(74) *Attorney, Agent, or Firm* — Ingrassia Fisher & Lorenz, P.C.

(57) ABSTRACT

A method for providing location based security for communication between a remote device and a mobile device having a global positioning system receiver for determining its current position. The method comprises receiving geographic data from the remote device, determining if the mobile device is within a predetermined geographic region based on the geographic data and the current position, and enabling subsequent communication with the remote device when the current position is within the predetermined geographic region.

20 Claims, 3 Drawing Sheets

(56) References Cited

U.S. PATENT DOCUMENTS

| | | | |
|---|---|---|---|
| 2008/0012760 A1* | 1/2008 | Derrick et al. | 342/357.07 |
| 2008/0012761 A1* | 1/2008 | Derrick et al. | 342/357.07 |
| 2008/0018458 A1* | 1/2008 | Derrick et al. | 340/539.13 |
| 2008/0018459 A1* | 1/2008 | Derrick et al. | 340/539.13 |
| 2008/0022409 A1* | 1/2008 | Hondo et al. | 726/26 |
| 2008/0043686 A1* | 2/2008 | Sperti et al. | 370/338 |
| 2008/0164984 A1* | 7/2008 | Sheffer | 340/426.13 |
| 2008/0170679 A1* | 7/2008 | Sheha et al. | 379/201.06 |
| 2008/0188246 A1* | 8/2008 | Sheha et al. | 455/457 |
| 2009/0054108 A1* | 2/2009 | Kito | 455/566 |
| 2009/0063451 A1* | 3/2009 | Bennett | 707/5 |
| 2009/0088181 A1* | 4/2009 | Savolainen | 455/456.1 |
| 2009/0158032 A1* | 6/2009 | Costa et al. | 713/156 |
| 2009/0160673 A1* | 6/2009 | Cirker | 340/825.69 |
| 2009/0186605 A1* | 7/2009 | Apfel et al. | 455/416 |
| 2010/0029302 A1* | 2/2010 | Lee et al. | 455/456.6 |
| 2010/0042940 A1* | 2/2010 | Monday et al. | 715/764 |
| 2010/0144367 A1* | 6/2010 | Goh et al. | 455/456.1 |
| 2010/0238024 A1* | 9/2010 | Derrick et al. | 340/539.13 |

OTHER PUBLICATIONS

Chinese Patent & Trademark Office, Chinese Office Action dated Feb. 20, 2013 for Application No. 200910209069.4.

* cited by examiner

APPARATUS AND METHOD FOR PROVIDING LOCATION BASED SECURITY FOR COMMUNICATION WITH A REMOTE DEVICE

TECHNICAL FIELD

The present invention generally relates to electronic communication systems, and more particularly relates to an apparatus and method for providing location based security for communication with a remote device.

BACKGROUND OF THE INVENTION

Increasingly vehicles are equipped with satellite, cellular, and/or other vehicular communication systems. Such vehicular communication systems enable a vehicle to communicate with one or more remote devices, such as a laptop that is used by a mechanic at a repair facility or other authorized location. These remote devices establish secure connections with the vehicular communication system to gather information regarding the vehicle (e.g., mileage, engine temperature, oil level, and other operating information) or to enable or provision certain features on the vehicle (e.g., navigation services and on-call support).

Due to their mobile nature it is possible for unauthorized persons to gain control of a remote device (e.g., by theft or other illegitimate methods). The unauthorized individual may then take the remote device to another location, such as a parking lot, and use it to obtain information regarding a vehicle that they do not own, or to take other undesirable actions. This threat would be greatly reduced by preventing the remote device from acquiring data from, or configuring, a vehicle when the vehicle is not at an authorized location.

Accordingly, it is desirable to provide a method for preventing the user of a remote device to request data from, or configure, a vehicle if the vehicle is not at an authorized location. Furthermore, other desirable features and characteristics of the present invention will become apparent from the subsequent detailed description and the appended claims, taken in conjunction with the accompanying drawings and the foregoing technical field and background.

SUMMARY OF THE INVENTION

In accordance with one embodiment of the invention, an apparatus for providing location based security for communication between a vehicle and a remote device is disclosed. The apparatus comprises a wireless transceiver coupled to the vehicle, a global positioning system receiver coupled to the vehicle for determining a current position of the vehicle, and a processor coupled to the wireless transceiver and the global positioning system receiver. The processor is configured to receive a digital certificate comprising geographic data and a corresponding digital signature from the remote device via the wireless transceiver, verify that the digital certificate was issued by a trusted certificate authority, and determine if the vehicle is positioned within a predetermined geographic region based on the geographic data and the current position of the vehicle.

In other embodiments, a method for providing location based security for communication between a remote device and a mobile device having a global positioning system receiver for determining its current position is disclosed. The method comprises receiving geographic data from the remote device, determining if the mobile device is within a predetermined geographic region based on the geographic data and the current position, and enabling subsequent communication with the remote device when the current position is within the predetermined geographic region.

DESCRIPTION OF THE DRAWINGS

The present invention will hereinafter be described in conjunction with the following drawing figures, wherein like numerals denote like elements.

DESCRIPTION OF AN EXEMPLARY EMBODIMENT

Figure 2:
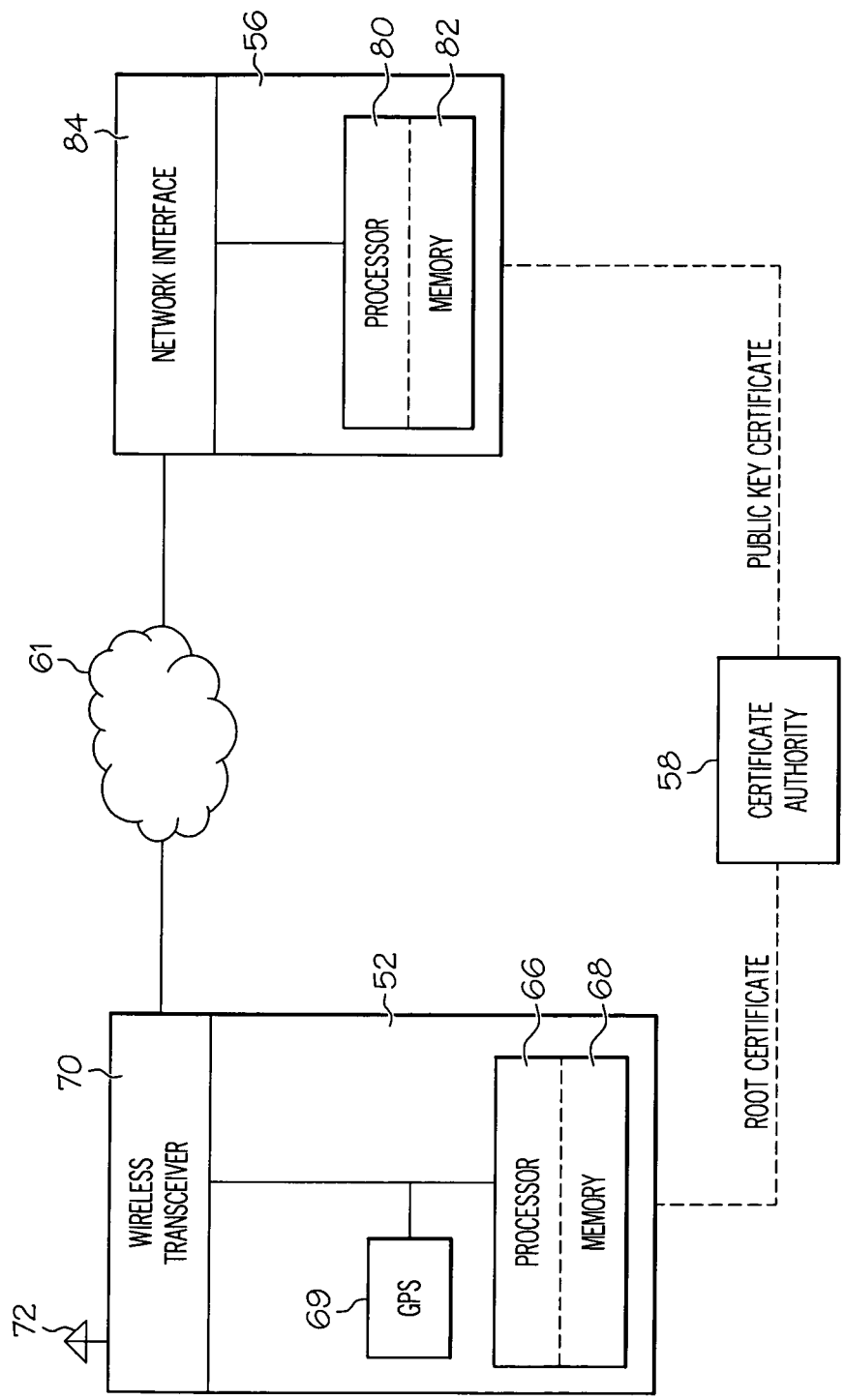
FIG. 2 is a block diagram of a system for providing location based security for communication between a mobile device and a remote device.
Figure 3:
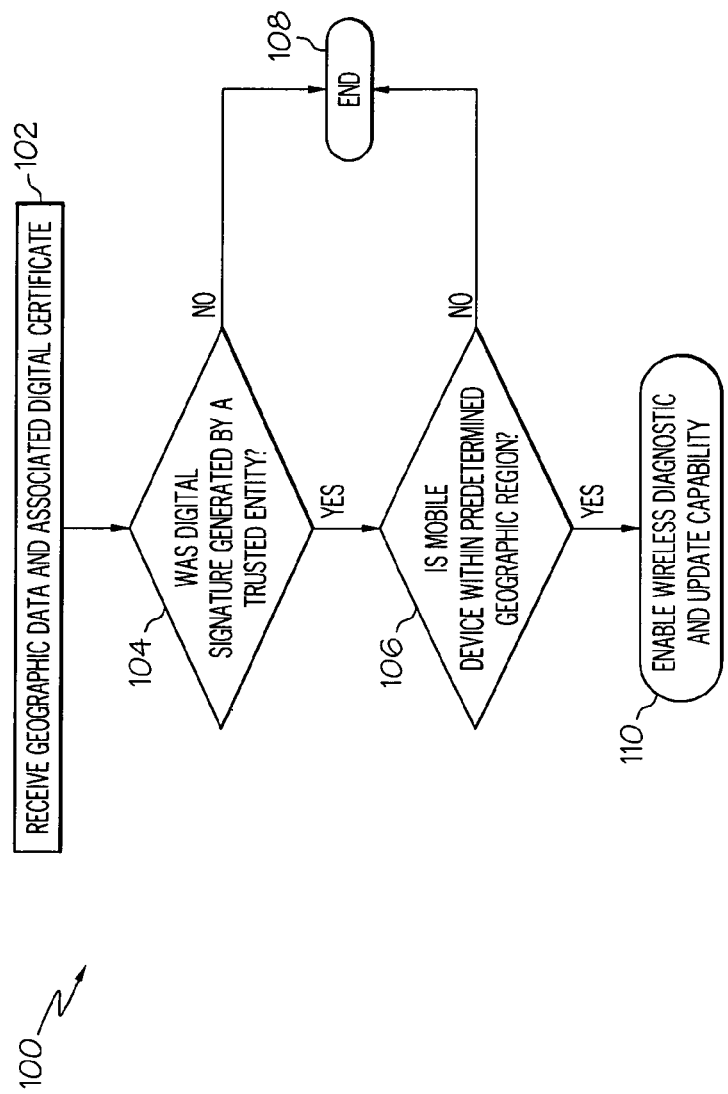
FIG. 3 is a flow chart of method for providing locations based security for electronic communications using the system of FIG. 2.

The following detailed description is merely exemplary in nature and is not intended to limit the invention or the application and uses of the invention. Furthermore, there is no intention to be bound by any expressed or implied theory presented in the preceding technical field, background, brief summary or the following detailed description. It should also be understood that FIGS. 1-3 are merely illustrative and, particularly with respect to FIG. 1, may not be drawn to scale.

Figure 1:
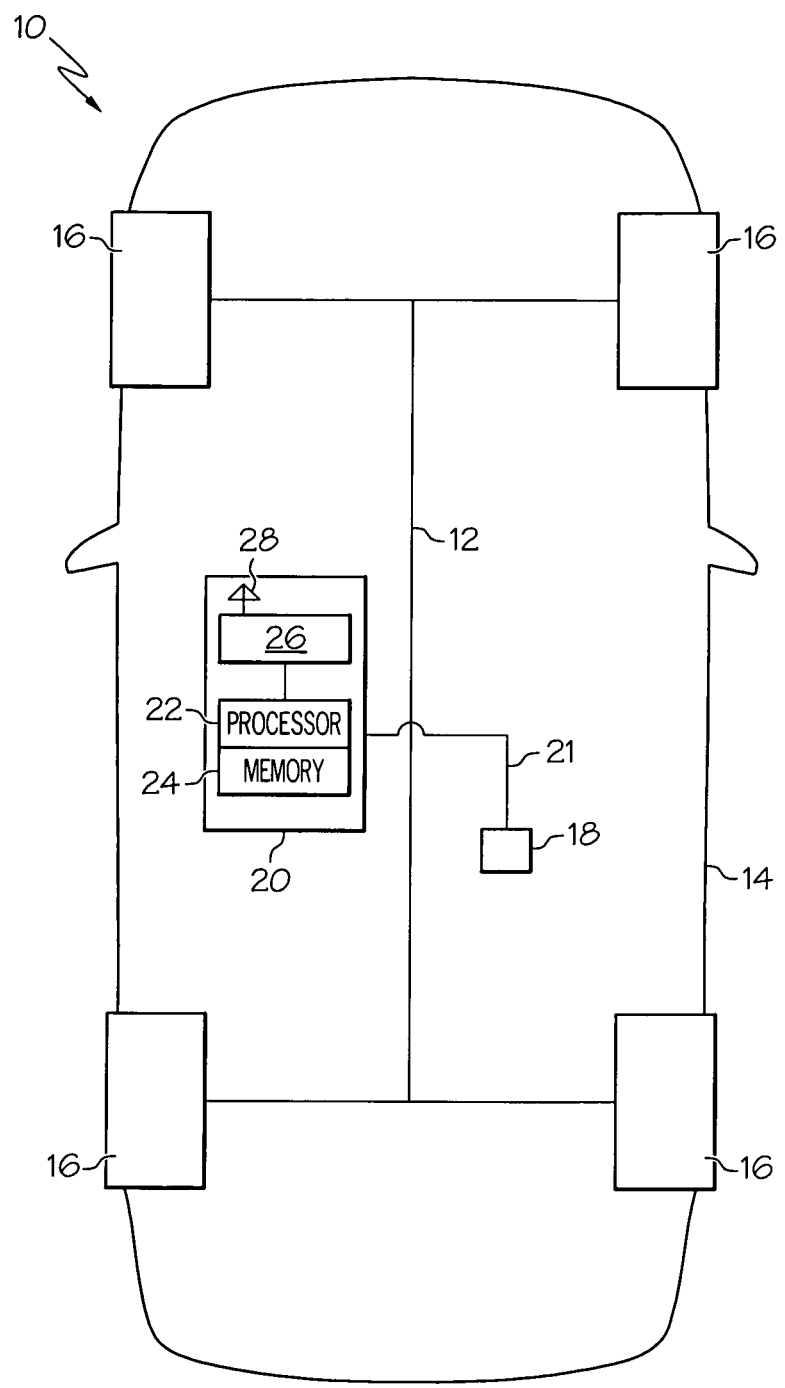
FIG. 1 depicts an exemplary vehicle configured for use with a first embodiment of the present invention.

FIG. 1 is a depiction of an exemplary vehicle 10 configured for use with a first embodiment of the present invention. The vehicle 10 includes a chassis 12, a body 14, four wheels 16, a Global Positioning System (GPS) 18, and a Vehicle Communication System (VCS) 20. The body 14 is arranged on the chassis 12 and substantially encloses the other components of the vehicle 10. The body 14 and the chassis 12 may jointly form a frame. The wheels 16 are each rotationally coupled to the chassis 12 near a respective corner of the body 14.

The vehicle 10 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD), or all-wheel drive (AWD). The vehicle 10 may also incorporate any one of, or combination of, a number of different types of engines (or actuators), such as, for example, a gasoline or diesel fueled combustion engine, a "flex fuel vehicle" (FFV) engine (i.e., using a mixture of gasoline and alcohol), a gaseous compound (e.g., hydrogen and/or natural gas) fueled engine, or a fuel cell, a combustion/electric motor hybrid engine, and an electric motor.

GPS 18 determines its current position (e.g., a latitude and a longitude) on the basis of signals sent from a plurality of satellites revolving around the earth. As GPS 18 is coupled to vehicle 10, the current position of GPS 18 corresponds to the current position of vehicle 10 and VCS 20. GPS 18 may be a component of the VCS 20, a stand-alone component, or part of a separate Electronic Control Unit (ECU) or vehicle system. In the depicted embodiment, GPS 18 transmits the current position of vehicle 10 to VCS 20 via a vehicle data bus 21. It will be understood by one who is skilled in the art that other position devices and methods for determining the current position of the vehicle may also be used in connection with the embodiments of the present invention.

VCS 20 determines if vehicle 10 is positioned within a predetermined geographic region based on geographic data received from a remote device and the current position of vehicle 10 as determined by GPS 18. The predetermined geographic region corresponds to an authorized location (e.g., a vehicle dealership or service facility) for communication between the remote device and VCS 20. If vehicle 10 is positioned within the predetermined geographic region, VCS 20 will respond to subsequent requests from the remote device regarding vehicle 10, including requests for operational or diagnostic data, requests to enable or reprogram certain configurable options, and other requests regarding vehicle 10.

In the illustrated embodiment, the VCS 20 includes a processor 22, memory 24, and a wireless transceiver 26. As used herein, the term "processor" may refer to a programmable logic control system (PLC), a microprocessor, or any other type of electronic controller. It may include one or more components of a digital and/or analog type and may be programmable by software and/or firmware. In addition, the term "memory" may refer to electronic memory (e.g., ROM, RAM, or another form of electronic memory) and stores instructions and/or data in any format, including source or object code.

Wireless transceiver 26 is coupled to a wireless antenna 28 and enables wireless communications between the VCS 20 and an electronic network via a wireless network access point. In one embodiment the wireless transceiver 26 includes a short range wireless communication device that communicates with a wireless router or other short range network communication device. Further, wireless transceiver 26 may include a cellular modem that is coupled to a cellular phone. In this case, the cellular phone connects the wireless modem to an Internet Service Provided (ISP) modem or other telephonic network access point. It should be noted that in other embodiments, other wireless communication technologies (including satellite) may also be used.

Processor 22 is coupled to wireless transceiver 26. As further described below, processor 22 receives geographic data and an associated digital signature from the remote device. The digital signature is associated with the geographic data in that it is generated by digitally signing a message that includes the geographic data. Processor 22 then authenticates the geographic data by verifying that the digital signature was generated by a trusted entity. If the digital signature was generated by a trusted entity, processor 22 utilizes the current position of vehicle 10 and the geographic data to determine if vehicle 10 is positioned within the predetermined geographic region. If vehicle 10 is positioned within the predetermined geographic region, processor 22 enables subsequent communications with the remote device regarding vehicle 10.

Although the illustrated embodiment depicts a vehicular communication system (e.g., VCS 20), it will be understood by one who is skilled in the art that alternative embodiments of the present invention may utilize other mobile devices as well. Such mobile devices may include a personal computer (e.g., a laptop), a Personal Digital Assistant (PDA), a cell phone, or any other mobile computing device having a GPS for determining its position, a wireless transceiver for receiving digitally signed geographic data from a remote device, and a processor for authenticating the digitally signed geographic data, determining if the mobile device is within a predetermined geographic region, and enabling subsequent communications with the remote device if the mobile device is within the predetermined geographic region. These subsequent communications may include requests from the remote device for operational or diagnostic data or requests to enable or reprogram certain configurable options on the mobile device.

FIG. 2 is a block diagram of an exemplary system 50 for providing location based security for communication between a mobile device 52 and a remote device 56. As depicted, system 50 includes the mobile device 52, a remote device 56, and a trusted certificate authority 58. Mobile device 52 communicates with remote device 56 via an electronic network 61 or other communication medium. It may include a processor 66, memory 68, a GPS 69, a wireless transceiver 70, and an antenna 72. GPS 69 provides signals indicative of the current position of mobile device 52 and, in some instances, an object (e.g., a vehicle) that is coupled to mobile device 52. GPS 69 may be integrally formed with mobile device 52 (as depicted) or it may be a separate component that is coupled to mobile device 52.

As noted above, in a one embodiment mobile device 52 is a vehicular communication system (e.g., VCS 20 of FIG. 1) that is coupled to a vehicle (e.g., vehicle 10 of FIG. 1). However, mobile device may be any type of mobile device that is capable of performing the functions described below.

Remote device 56 may be any electronic device that is capable of establishing a secure connection with mobile device 52 via the electronic network 61, including a personal computer (laptop or desktop), PDA, cell phone, or other computing device. As depicted, the remote device 56 includes a processor 80, memory 82, and a network interface 84. The network interface 84 enables the remote device 56 to communicate with mobile device 52 via the electronic network 61.

As further described below, processor 80 for remote device 56 transmits geographic data and a digital signature to mobile device 52. The digital signature is generated by a trusted entity (e.g., the certificate authority 58) that digitally signs a message that includes the geographic data. The digital signature enables mobile device 52 to verify that the geographic data comes from a trusted entity. The geographic data enables mobile device 52 to identify a predetermined geographic region that corresponds to an authorized location for communication between mobile device 52 and remote device 56.

Certificate authority 58 is maintained by a trusted entity and issues a root certificate to mobile device 52. This root certificate includes a public key that mathematically corresponds to a private key known only to certificate authority 58. As described below, mobile device 52 utilizes the root certificate to authenticate public key certificates that are issued to remote device 56 by certificate authority 58. The root certificate may be stored in memory 68 on mobile device 52 during production or it may be transmitted from certificate authority 58 to mobile device 52 via a secure connection at a later time.

In addition, certificate authority 58 also issues a public key certificate to remote device 56. The public key certificate includes the geographic data and a digital signature. In one embodiment the public key certificate conforms to the X.509 standard for digital certificates and the geographic data is encoded into one of defined fields for such a digital certificate. For example, the geographic data may be appended to the end of the common name field or included in an extension for the X.509 certificate. Alternatively, the geographic data may be placed in an X.509 compliant extension. The certificate authority 58 generates the digital certificate by digitally signing a message that includes the geographic data using the private key that mathematically corresponds to the public key from the root certificate.

FIG. 3 is a flowchart of an exemplary method 100 for providing location based security for electronic communications. With reference to FIGS. 2 and 3, method 100 begins during step 102 when mobile device 52 receives geographic data and an associated digital signature from the remote device 56. As described above, the digital signature is associated with the geographic data in that it is generated by digitally signing a message that includes the geographic data. For example, during step 102 the mobile device 52 may receive a public key certificate (PUB_CERT) from remote device 56. As described above, PUB_CERT is issued to remote device 56 by a trusted entity (e.g., certificate authority 58) and includes digitally signed geographic data.

In some embodiments step 102 is performed during a handshaking procedure for establishing a secure connection between remote device 56 and mobile device 52. For example, remote device 56 may transmit its public key certificate to mobile device 52 as part of a handshaking procedure for establishing a Transport Layer Security (TLS) connection. The TLS connection may be a one-way TLS connection in which remote device 56 transmits its public key certificate to mobile device 52 during the handshaking procedure or a mutual TLS connection in which remote device 56 and mobile device 52 exchange public key certificates. It should be noted that other types of secure connections may also be used in connection with embodiments of the present invention, including Secure Socket Layer (SSL) or any other security protocol that enables the remote device 56 to transmit a public key certificate to mobile device 52.

Next, during step 104 processor 66 determines if the digital signature was generated by a trusted entity (e.g., certificate authority 58). During this step processor 66 utilizes the public key that corresponds to the trusted entity, a digital signature authentication technique, and the appropriate message to verify that the digital signature was generated by the trusted entity using its private key. The message will include the geographic data and, in some cases, other data that was received from the remote device 56 during step 102.

For example, during step 104 the processor 66 may retrieve the root certificate for certificate authority 58 from memory 68. Processor 66 then utilizes the public key for the certificate authority 58 to determine if the digital signature from PUB_CERT was generated by certificate authority 58. If processor 66 determines that the digital signature was generated by certificate authority 58, processor 66 proceeds to step 106. Otherwise, the method 100 is terminated (step 108).

During step 106, processor 66 determines if the mobile device 52 is within a predetermined geographic area based on the geographic data and the current position provided by GPS 69 (P1). In some embodiments the geographic data comprises coordinates (e.g., a latitude and a longitude) of a single location (L1). In this case, processor 66 may determine the distance (D1) between P1 and L1. If the D1 is less than a predetermined threshold distance, processor 66 determines that mobile device 52 and/or the object is within the predetermined geographic region.

Alternatively, processor 66 may be configured to determine coordinates for a predetermined geographic region having a predetermined shape and size and that is positioned based on L1. For example, processor 66 may determine the coordinates for a geographic region having a predetermined shape (e.g., circular or polygonal) and size and L1 as its center point. Processor 66 then determines if P1 is within that predetermined geographic region.

In another embodiment, the geographic data comprises the coordinates for a plurality of points that define a border for the predetermined geographic region. In this case, processor 66 determines if P1 is within the bounded region.

If processor 66 determines that P1 is within the predetermined geographic region, processor 66 enables subsequent communication between remote device 56 and mobile device 52 (step 110). This subsequent communication may include requests from remote device 56 for diagnostic or operational data or requests to enable or reprogram certain configurable options for mobile device 52 or an object (e.g., a vehicle) that is coupled to mobile device 52. In some embodiments, processor 66 may set a flag (FLAG) to indicate that P1 is at the authorized location during step 110. In this case, processor 66 will act in response to the request only if FLAG is set and remote device 56 is otherwise authorized to communicate with mobile device 52 regarding the vehicle (e.g., there is a secure connection between mobile device 52 and remote device 56).

On the other hand, if processor 66 is unable to authenticate the digital signature during step 104 or processor 66 determines that P1 is not within the predetermined geographic region during step 106, processor 66 exits method 100 (step 108). In this case, processor 66 does not enable subsequent communication between remote device 56 and mobile device 52. In the embodiment described above, processor 66 does not set FLAG and will not act in response to subsequent requests from remote device 56. In addition, processor 66 may transmit an error message to remote device 56 during step 108.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A method for providing location based security for communication between a remote device and a vehicle having a global positioning system receiver for determining a current position of the vehicle, the method comprising:
receiving, via a transceiver onboard the vehicle, geographic data from the remote device, the geographic data comprising a latitude and a longitude for a single location;
determining if the vehicle is located at an authorized vehicle service facility based on the geographic data and the current position;
enabling subsequent communication between the remote device and the vehicle when the vehicle is located at the authorized vehicle service facility, and
disabling subsequent communication between the remote device and the vehicle when the vehicle is not located at the authorized vehicle service facility.

2. The method of claim 1, wherein the step of receiving further comprises receiving a digital signature, wherein a trusted entity generates the digital signature by digitally signing a message that comprises the geographic data.

3. The method of claim 2, further comprising verifying that the digital signature was generated by the trusted entity.

4. The method of claim 3, wherein the step of receiving further comprises receiving a digital certificate from the remote device, the digital certificate comprising the geographic data and the digital signature.

5. The method of claim 4, wherein the step of receiving further comprises receiving the digital certificate as part of a handshake procedure for establishing a secure connection between the remote device and the vehicle.

6. The method of claim 5, wherein the step of receiving further comprises receiving the digital certificate as part of a Transport Layer Security handshake procedure.

7. The method of claim 1, wherein the method further comprises determining if the current position of the vehicle is within the authorized vehicle service facility based on a comparison of the coordinates of the single location with the current position of the vehicle.

8. An apparatus for providing location based security for communication between a vehicle and a remote device, the apparatus comprising:
a wireless transceiver coupled to the vehicle;
a global positioning system receiver coupled to the vehicle for determining a current position of the vehicle; and
a processor coupled to the wireless transceiver and the global positioning system receiver, the processor configured to:
receive a digital certificate comprising geographic data and a corresponding digital signature from the remote device via the wireless transceiver, the geographic data comprising a latitude and a longitude for a single location;
verify that the digital certificate was issued by a trusted certificate authority;
determine if the vehicle is located at an authorized vehicle dealership based on the geographic data and the current position of the vehicle;
enable subsequent communication between the remote device and the vehicle when the vehicle is located at the authorized vehicle dealership and the digital certificate was issued by a trusted certificate authority; and
disable subsequent communication between the remote device and the vehicle when the vehicle is not located at the authorized vehicle dealership, the digital certificate was not issued by a trusted certificate authority, or both.

9. The apparatus of claim 8, wherein the processor is further configured to receive the digital certificate during a handshake procedure for establishing a secure connection with the remote device.

10. The apparatus of claim 9, wherein the processor is further configured to receive the digital certificate during a Transport Layer Security handshake procedure.

11. The method of claim 9, wherein the single location comprises the authorized vehicle service facility.

12. The method of claim 11, further comprising:
calculating a distance between the single location of the authorized vehicle service facility and the current position of the vehicle using:
latitude and longitude coordinates of the authorized vehicle service facility as obtained from the geographic data; and
latitude and longitude coordinates of the vehicle as obtained from the GPS;
wherein the step of determining if the vehicle is located at the authorized vehicle service facility comprises:
determining that the vehicle is located at the authorized vehicle service facility when the calculated distance is less than a predetermined threshold value; and
determining that the vehicle is not located at the authorized vehicle service facility when the calculated distance is greater than the predetermined threshold value.

13. The method of claim 12, wherein:
the step of enabling subsequent communication between the remote device and the vehicle comprises enabling subsequent communication between the remote device and the vehicle when the vehicle is located at the authorized vehicle service facility, based on whether the calculated distance is less than the predetermined threshold; and
the step of disabling subsequent communication between the remote device and the vehicle comprises disabling subsequent communication between the remote device and the vehicle when the vehicle is not located at the authorized vehicle service facility, based on whether the calculated distance is greater than the predetermined threshold.

14. The apparatus of claim 8, wherein the single location comprises the authorized vehicle dealership.

15. The apparatus of claim 14, wherein the processor is further configured to determine if the distance between the single location and the current position of the vehicle is less than a predetermined threshold distance.

16. The apparatus of claim 8, wherein the processor is further configured to:
calculate a distance between the single location of the authorized vehicle dealership and the current position of the vehicle using:
latitude and longitude coordinates of the authorized vehicle dealership as obtained from the geographic data; and
latitude and longitude coordinates of the vehicle as obtained from the GPS;
determine that the vehicle is located at the authorized vehicle dealership when the calculated distance is less than a predetermined threshold value;
determine that the vehicle is not located at the authorized vehicle dealership when the calculated distance is greater than the predetermined threshold value;
enable subsequent communication between the remote device and the vehicle when the vehicle is located at the authorized vehicle dealership, based on whether the calculated distance is less than the predetermined threshold; and
disable subsequent communication between the remote device and the vehicle when the vehicle is not located at the authorized vehicle dealership, based on whether the calculated distance is greater than the predetermined threshold.

17. An apparatus for establishing a secure connection with a vehicle, the apparatus comprising:
a network interface for communicating with the vehicle while the vehicle is located at an authorized vehicle service facility;
a processor coupled to the network interface and configured to:
transmit geographic data and an associated digital signature to the vehicle, the geographic data comprising a latitude and a longitude for a single location;
receive data regarding the vehicle from a remote device when the vehicle is located at the authorized vehicle service facility as determined based on the geographic data;
determine if the vehicle is located at an authorized vehicle dealership based on the geographic data and the current position of the vehicle;
enable subsequent communication between the remote device and the vehicle when the vehicle is located at the authorized vehicle service facility; and
disable subsequent communication between the remote device and the vehicle when the vehicle is not located at the authorized vehicle service facility.

18. The apparatus of claim 17, wherein the processor is further configured to transmit a digital certificate issued by a trusted certificate authority to the vehicle, the digital certificate comprising geographic data and the associated digital signature.

19. The apparatus of claim 18, wherein the processor is further configured to transmit the digital certificate to the vehicle during a Transport Layer Security handshake procedure.

20. The apparatus of claim 17, wherein:
the single location comprises the authorized vehicle service facility; and
the processor is further configured to:
  calculate a distance between the single location of the authorized vehicle service facility and the current position of the vehicle using:
    latitude and longitude coordinates of the authorized vehicle service facility as obtained from the geographic data; and
    latitude and longitude coordinates of the vehicle as obtained from the GPS;
  determine that the vehicle is located at the authorized vehicle service facility when the calculated distance is less than a predetermined threshold value;
  determine that the vehicle is not located at the authorized vehicle service facility when the calculated distance is greater than the predetermined threshold value;
  enable subsequent communication between the remote device and the vehicle when the vehicle is located at the authorized vehicle service facility, based on whether the calculated distance is less than the predetermined threshold; and
  disable subsequent communication between the remote device and the vehicle when the vehicle is not located at the authorized vehicle service facility, based on whether the calculated distance is greater than the predetermined threshold.

* * * * *